US012747306B2

(12) United States Patent
Watanuki

(10) Patent No.: US 12,747,306 B2
(45) Date of Patent: Sep. 29, 2026

(54) TELLURIUM-CONTAINING COMPOUND, POLYMER, AND METHOD FOR PRODUCING POLYMER

(71) Applicant: AGC Inc., Tokyo (JP)

(72) Inventor: Shun Watanuki, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 615 days.

(21) Appl. No.: 18/331,551

(22) Filed: Jun. 8, 2023

(65) Prior Publication Data

US 2023/0312771 A1 Oct. 5, 2023

Related U.S. Application Data

(63) Continuation of application No. PCT/JP2021/043061, filed on Nov. 24, 2021.

(30) Foreign Application Priority Data

Dec. 14, 2020 (JP) ................................ 2020-207031

(51) Int. Cl.
*C08F 4/42* (2006.01)
*C08F 2/38* (2006.01)
*C08F 214/18* (2006.01)
*C08F 214/26* (2006.01)

(52) U.S. Cl.
CPC .................. *C08F 4/42* (2013.01); *C08F 2/38* (2013.01); *C08F 214/182* (2013.01); *C08F 214/26* (2013.01); *C08F 2438/00* (2013.01)

(58) Field of Classification Search
None
See application file for complete search history.

(56) References Cited

U.S. PATENT DOCUMENTS

| | | | | |
|---|---|---|---|---|
| 2016/0297755 | A1* | 10/2016 | Bando | C08F 12/08 |
| 2019/0106524 | A1* | 4/2019 | Yamago | C08F 4/42 |
| 2019/0389983 | A1 | 12/2019 | Ohkura et al. | |

FOREIGN PATENT DOCUMENTS

| | | | |
|---|---|---|---|
| SU | 1203088 | A1 * | 1/1986 |
| SU | 1567573 | A1 * | 5/1990 |
| WO | WO 2017/191766 | A1 | 11/2017 |
| WO | WO 2018/164147 | A1 | 9/2018 |

OTHER PUBLICATIONS

SU 1567573A1, 1990, Derwent Abstract (Year: 1990).*
SU-1203088-A1, 1986, Derwent Abstract (Year: 1986).*
International Search Report issued Feb. 15, 2022 in PCT/JP2021/043061 filed on Nov. 24, 2021, 2 pages.
Lu et al., "Synthesis of structurally controlled hyperbranched polymers using a monomer having hierarchical reactivity", Nature Communications 2017, (8 pages).
Sazonov et al., "1,2-Shift of Element-Centered Groups (RnE) in Carbenoid Anions [RnECF2CFCl]—and its Relevance for Nucleophilic Vinylic Substitution: a DFT Study", ChemistrySelect, 2016 (14 pages).
Rodrigo Cella, et al., "Palladium-catalyzed cross-coupling of vinylic tellurides and potassium vinyltrifluoroborate salt: synthesis of 1,3-dienes", Tetrahedron Letters, vol. 47, No. 29, Jul. 17, 2006, pp. 5075-5078.
Naumann Dieter et al., "Syntheses, Properties, and Structures of Bis(trifluorovinyl) Tellurium Compounds", Z. Anorg. Allg. Chem., Feb. 13, 2009, pp. 862-868 (with English Abstract and Translation).

* cited by examiner

*Primary Examiner* — Satya B Sastri
(74) *Attorney, Agent, or Firm* — Oblon, McClelland, Maier & Neustadt, L.L.P.

(57) ABSTRACT

Provided are: a tellurium-containing compound represented by Formula (M1); a polymer of a tellurium-containing compound represented by any one of Formulae (M1) to (M3); and a method for producing a polymer. Each of $X^1$ to $X^3$, $Y^1$ to $Y^3$ and $Z^1$ to $Z^3$ independently denotes a hydrogen atom, a fluorine atom, a chlorine atom, a bromine atom, an iodine atom, or an organic group having from 1 to 20 carbon atoms; at least one of $X^1$, $Y^1$, or $Z^1$ is a fluorine atom; at least one of $X^2$, $Y^2$, or $Z^2$ is a chlorine atom, a perfluoroalkyl group, a monovalent hydrocarbon group having an oxyperfluoroalkylene structure, or a phenyl group; and each of $R^1$ to $R^3$ denotes an organic group having from 1 to 20 carbon atoms.

(M1)

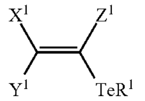

(M2)

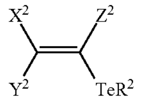

(M3)

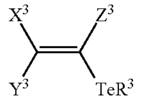

8 Claims, No Drawings

TELLURIUM-CONTAINING COMPOUND, POLYMER, AND METHOD FOR PRODUCING POLYMER

CROSS-REFERENCE TO RELATED APPLICATIONS

This application is a continuation of International Application No. PCT/JP2021/043061, filed on Nov. 24, 2021, which claims priority from Japanese Patent Application No. 2020-207031, filed on Dec. 14, 2020. The entire disclosure of each of the above applications is incorporated herein by reference.

TECHNICAL FIELD

The present disclosure relates to a tellurium-containing compound, a polymer, and a method for producing a polymer.

BACKGROUND ART

Radical polymerization reactions are widely used industrially, since the reactions have excellent versatility in monomers, and can be easily carried out even in polar media such as water. However, the ability to control the molecular weight by general radical polymerization methods is limited, and polymers obtained thereby tend to have a wide molecular weight distribution. On the other hand, living radical polymerization methods have attracted attention as polymerization methods that can obtain a controlled molecular structure, and various polymerization control agents have been developed. Living radical polymerization methods are polymerization methods that control the radical polymerization rate by reversibly protecting the growing radicals with protective groups, which are dormant species, thereby enabling the control of the molecular weight distribution.

Patent Literature 1 describes a living radical polymerization method for producing a haloolefin polymer or copolymer by radically polymerizing a specific haloolefin in the presence of a specific organic tellurium compound. This method is based on a method called a TERP (organotellurium mediated living radical polymerization; a living radical polymerization method using an organic tellurium compound) method.

Incidentally, in recent years, there is an increased importance of developing polymers having a branched structure in the molecules thereof. Branched polymers have various properties different from those of linear polymers. For example, since branched polymers have multiple terminal groups, when used as a molding material, the branched polymers can increase the crosslinking density of the molded body and improve curability. Further, branched polymers are also known to have lower intrinsic viscosity and lower glass transition temperature as compared to linear polymers. As can be seen from the above, branched polymers have unique properties different from those of linear polymers, and have high industrial utility.

Non-Patent Literature 1 discloses a controlled polymerization method for preparing a hyperbranched polymer by copolymerizing a vinyl telluride and an acrylic acid monomer in the presence of a tellurium compound as a chain transfer agent, based on the TERP method.

CITATION LIST

Patent Literature

Patent Literature 1: WO 2018/164147 A1

Non-Patent Literature

Non-Patent Literature 1: Yangtian Lu et al., Synthesis of structurally controlled hyperbranched polymers using a monomer having hierarchical reactivity. Nature Communications 2017, 8 (1)

SUMMARY OF INVENTION

Technical Problem

However, at present, there are limited findings regarding the techniques for producing a polymer having a branched structure by controlled polymerization.

A first embodiment of the disclosure relates to providing a novel tellurium-containing compound that can be used for producing a polymer having a controlled molecular structure and a branched structure, and a polymer produced using the tellurium-containing compound.

A second embodiment of the disclosure relates to providing a novel polymer having a controlled molecular structure and a branched structure.

A third embodiment of the disclosure relates to providing a polymer having a controlled molecular structure and a branched structure and formed by polymerizing a fluorine-containing monomer.

A fourth embodiment of the disclosure relates to providing a method for producing a polymer having a controlled molecular structure and a branched structure.

A fifth embodiment of the disclosure relates to providing a novel method for producing a polymer having a controlled molecular structure and a branched structure.

A sixth embodiment of the disclosure relates to providing a method for producing a polymer having a controlled molecular structure and a branched structure and formed by polymerizing a fluorine-containing monomer.

Solution to Problem

Means for solving the foregoing problems include the following aspects.

[1] A tellurium-containing compound represented by the following Formula (M1).

(M1)

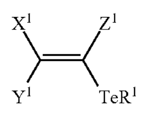

wherein, in Formula (M1):

each of $X^1$, $Y^1$, and $Z^1$ independently denotes a hydrogen atom, a fluorine atom, a chlorine atom, a bromine atom, an iodine atom, or an organic group having from 1 to 20 carbon atoms, and at least one of $X^1$, $Y^1$, or $Z^1$ denotes a fluorine atom, and $R^1$ denotes an organic group having from 1 to 20 carbon atoms.

[2] The tellurium-containing compound according to [1], wherein, in Formula (M1), $R^1$ is a substituted or unsubstituted alkyl group having from 1 to 20 carbon atoms, a substituted or unsubstituted alkoxy group having from 1 to 20 carbon atoms, a substituted or unsubstituted monovalent hydrocarbon group having an oxyalkylene structure and having from 1 to 20 carbon atoms, or a substituted or unsubstituted aryl group having from 3 to 20 carbon atoms.

[3] The tellurium-containing compound according to [1] or [2], wherein, in Formula (M1), each of $X^1$, $Y^1$, and $Z^1$ is independently a hydrogen atom, a fluorine atom, a chlorine atom, a substituted or unsubstituted alkyl group having from 1 to 20 carbon atoms, a substituted or unsubstituted monovalent hydrocarbon group having an oxyalkylene structure and having from 1 to 20 carbon atoms, or a substituted or unsubstituted aryl group having from 3 to 20 carbon atoms.

[4] A polymer obtained by polymerizing at least the tellurium-containing compound according to any one of [1] to [3].

[5] The polymer according to [4], wherein the polymer is obtained by polymerizing the tellurium-containing compound and a polymerizable compound having a carbon-carbon double bond in a molecule and being different from the tellurium-containing compound.

[6] The polymer according to [5], wherein the polymerizable compound is a compound represented by the following Formula (M11):

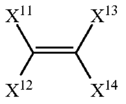

(M11)

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

[7] A polymer obtained by polymerizing at least a tellurium-containing compound represented by the following Formula (M2):

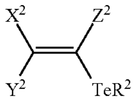

(M2)

wherein, in Formula (M2):

each of $X^2$, $Y^2$, and $Z^2$ independently denotes a hydrogen atom, a fluorine atom, a chlorine atom, a bromine atom, an iodine atom, or an organic group having from 1 to 20 carbon atoms, and at least one of $X^2$, $Y^2$, or $Z^2$ denotes a chlorine atom, a perfluoroalkyl group, a monovalent hydrocarbon group having an oxyperfluoroalkylene structure, or a phenyl group, and $R^2$ denotes an organic group having from 1 to 20 carbon atoms.

[8] The polymer according to [7], wherein the polymer is obtained by polymerizing the tellurium-containing compound and a polymerizable compound having a carbon-carbon double bond in a molecule and being different from the tellurium-containing compound.

[9] The polymer according to [8], wherein the polymerizable compound is a compound represented by the following Formula (M11).

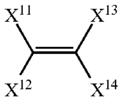

(M11)

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

[10] A polymer obtained by polymerizing at least a tellurium-containing compound represented by the following Formula (M3) and a compound represented by the following Formula (M11).

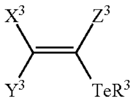

(M3)

wherein, in Formula (M3):

each of $X^3$, $Y^3$, and $Z^3$ independently denotes a hydrogen atom, a fluorine atom, a chlorine atom, a bromine atom, an iodine atom, or an organic group having from 1 to 20 carbon atoms, and $R^3$ denotes an organic group having from 1 to 20 carbon atoms,

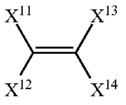

(M11)

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

[11] A method for producing a polymer, the method including polymerizing at least the tellurium-containing compound according to any one of [1] to [3] in the presence of at least one compound selected from the group consisting of a compound represented by the following Formula (T1) and a compound represented by the following Formula (T2):

(T1)

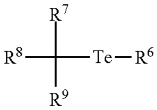

wherein, in Formula (T1), $R^6$ denotes a substituted or unsubstituted alkyl group having from 1 to 8 carbon atoms or a substituted or unsubstituted aryl group having from 3 to 16 carbon atoms, each of $R^7$ and $R^8$ independently denotes a hydrogen atom or a substituted or unsubstituted alkyl group having from 1 to 8 carbon atoms, and $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group, $(R^{10}Te)_2$ (T2)

wherein, in Formula (T2), $R^{10}$ denotes a substituted or unsubstituted alkyl group having from 1 to 8 carbon atoms or a substituted or unsubstituted aryl group having from 3 to 16 carbon atoms.

[12] The method for producing a polymer according to [11], the method including polymerizing the tellurium-containing compound according to any one of [1] to [3] and a polymerizable compound having a carbon-carbon double bond in a molecule and being different from the tellurium-containing compound.

[13] The method for producing a polymer according to [12], wherein the polymerizable compound is a compound represented by the following Formula (M11)

(M11)

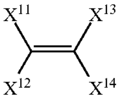

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

[14] A method for producing a polymer, the method including polymerizing at least a tellurium-containing compound represented by the following Formula (M2) in the presence of at least one compound selected from the group consisting of a compound represented by the following Formula (T1) and a compound represented by the following Formula (T2):

(T1)

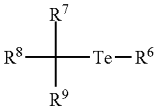

wherein, in Formula (T1), $R^6$ denotes a substituted or unsubstituted alkyl group having from 1 to 8 carbon atoms or a substituted or unsubstituted aryl group having from 3 to 16 carbon atoms, each of $R^7$ and $R^8$ independently denotes a hydrogen atom or a substituted or unsubstituted alkyl group having from 1 to 8 carbon atoms, and $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group, $(R^{10}Te)_2$ (T2)

wherein, in Formula (T2), $R^{10}$ denotes a substituted or unsubstituted alkyl group having from 1 to 8 carbon atoms or a substituted or unsubstituted aryl group having from 3 to 16 carbon atoms, (M2)

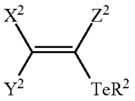

wherein, in Formula (M2):

each of $X^2$, $Y^2$, and $Z^2$ independently denotes a hydrogen atom, a fluorine atom, a chlorine atom, a bromine atom, an iodine atom, or an organic group having from 1 to 20 carbon atoms, and at least one of $X^2$, $Y^2$, or $Z^2$ denotes a chlorine atom, a perfluoroalkyl group, a monovalent hydrocarbon group having an oxyperfluoroalkylene structure, or a phenyl group, and $R^2$ denotes an organic group having from 1 to 20 carbon atoms.

[15] The method for producing a polymer according to [14], the method including polymerizing the tellurium-containing compound represented by Formula (M2) and a polymerizable compound having a carbon-carbon double bond in a molecule and being different from the tellurium-containing compound represented by Formula (M2).

[16] The method for producing a polymer according to [15], wherein the polymerizable compound is a compound represented by the following Formula (M11):

(M11)

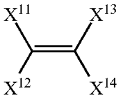

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

[17] A method for producing a polymer, the method including polymerizing at least a tellurium-containing compound represented by the following Formula (M3) and a compound represented by the following Formula (M11) in the presence of at least one compound selected from the group consisting of a compound represented by the following Formula (T1) and a compound represented by the following Formula (T2):

(T1)

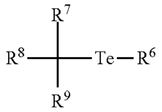

wherein, in Formula (T1), $R^6$ denotes a substituted or unsubstituted alkyl group having from 1 to 8 carbon atoms or a substituted or unsubstituted aryl group having from 3 to 16 carbon atoms, each of $R^7$ and $R^8$ independently denotes a hydrogen atom or a substituted or unsubstituted alkyl group having from 1 to 8 carbon atoms, and $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group, $(R^{10}Te)_2$ (T2)

wherein, in Formula (T2), $R^{10}$ denotes a substituted or unsubstituted alkyl group having from 1 to 8 carbon atoms or a substituted or unsubstituted aryl group having from 3 to 16 carbon atoms, (M3)

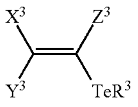

wherein, in Formula (M3):

each of $X^3$, $Y^3$, and $Z^3$ independently denotes a hydrogen atom, a fluorine atom, a chlorine atom, a bromine atom, an iodine atom, or an organic group having from 1 to 20 carbon atoms, and $R^3$ denotes an organic group having from 1 to 20 carbon atoms, (M11)

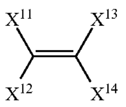

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

Advantageous Effects of Invention

According to the first embodiment of the disclosure, a novel tellurium-containing compound that can be used for producing a polymer having a controlled molecular structure and a branched structure, and a polymer produced using the tellurium-containing compound, are provided.

According to the second embodiment of the disclosure, a novel polymer having a controlled molecular structure and a branched structure is provided.

According to the third embodiment of the disclosure, a polymer having a controlled molecular structure and a branched structure and formed by polymerizing a fluorine-containing monomer is provided.

According to the fourth embodiment of the disclosure, a method for producing a polymer having a controlled molecular structure and a branched structure is provided.

According to the fifth embodiment of the disclosure, a novel method for producing a polymer having a controlled molecular structure and a branched structure is provided.

According to the sixth embodiment of the disclosure, a method for producing a polymer having a controlled molecular structure and a branched structure and formed by polymerizing a fluorine-containing monomer is provided.

DESCRIPTION OF EMBODIMENTS

Hereinafter, embodiments of the disclosure will be described in detail. However, the embodiments of the disclosure are not limited to the following embodiments. In the following embodiments, constituent elements (including elemental steps and the like) are not necessarily indispensable unless otherwise stated. The same applies to numerical values and ranges thereof, and the numerical values and ranges do not limit the embodiments of the disclosure.

In the disclosure, the term "step" encompasses an independent step separated from other steps as well as a step that is not clearly separated from other steps, as long as a purpose of the step can be achieved.

In the disclosure, a numerical range specified using "(from) . . . to . . . " represents a range including the numerical values noted before and after "to" as a minimum value and a maximum value, respectively.

In the disclosure, each component may include plural substances corresponding to the component. In a case in which plural substances corresponding to a component are present in a composition, the amount or content of the component therein means the total amount or content of the plural substances present in the composition unless otherwise specified.

In the disclosure, a reactive carbon-carbon double bond means a carbon-carbon double bond that can react in various ways as an olefin, and does not include an aromatic double bond.

In the disclosure, unless otherwise specified, an organic group or a hydrocarbon group may or does not necessarily have a substituent.

The number of carbon atoms of a compound or a constituent moiety thereof in the disclosure means, in a case in which the compound or the constituent moiety has a substituent, the number including the number of carbon atoms of the substituent.

In the disclosure, (meth)acrylic acid is a generic term for acrylic acid and methacrylic acid. (Meth)acrylate is a generic term for acrylate and methacrylate. (Meth) acrylamide is a generic term for acrylamide and methacrylamide.

In the disclosure, a "polymer" is a compound formed by polymerization of a monomer. In other words, a "polymer" has plural structural units.

In the disclosure, unless otherwise specified, the expressions "polymerizing compound A" and "polymerizing at least compound A" include both a case of polymerizing only compound A and a case of polymerizing compound A with another compound. The expressions "polymerizing compound A and compound B" and "polymerizing at least compound A and compound B" include both a case of polymerizing only compound A and compound B and a case of polymerizing compound A, compound B, and another compound. Here, compound A and compound B represent any compound described in the disclosure having a carbon-carbon double bond in the molecule. Further, unless otherwise specified, the polymer described in the disclosure may be a homopolymer of one kind of compound or a copolymer of two or more kinds of compounds. In the disclosure, the term "polymer" does not exclude a mixture containing raw materials (monomers, catalysts), by-products, impurities, and the like in addition to the polymer.

The disclosure relates to controlled polymerization for producing a polymer having a branched structure by using a tellurium-containing compound having a reactive carbon-carbon double bond. The findings of the disclosure can be used to obtain a polymer having a controlled molecular structure and a branched structure.

It has been found that the tellurium-containing compound, the polymer, and the method for producing a polymer described in detail in the disclosure are also useful for polymerization of a fluorine-containing monomer, although the embodiments of the disclosure are not limited thereby. Generally, it is difficult to perform controlled polymerization of fluorine-containing monomers as compared with controlled polymerization of hydrocarbon-based monomers. For example, Sk Arif et al., Progress in Polymer Science, Volume 106, July 2020, 101255 describes that, although it was possible to perform degradative chain transfer polymerization of an acrylate and styrene in the presence of a chain transfer agent such as organic stilbene or organic bismuth, there has been no report on the polymerization of fluoroalkenes using an organic tellurium compound as a chain transfer agent. Further, US 2013/225775 A describes that, although controlled polymerization methods have made great progress in polymerization of general monomers such as (meth)acrylic acid and styrene, the controlled polymerization methods are not yet efficient for polymerization of gaseous fluoroalkenes having high reactivity such as vinylidene fluoride, hexafluoropropene, and tetrafluoroethylene. In addition, in the controlled polymerization of fluorine-containing monomers, there has been no report on the findings regarding a method of introducing a branched structure into the molecules of the polymers. The inventor has found that the tellurium-containing compound, the polymer, and the method for producing a polymer described in detail in the disclosure are suitably applicable to polymerization of a fluorine-containing monomer.

Hereinafter, each embodiment of the disclosure will be described in detail.

First Embodiment

<Tellurium-Containing Compound>

A tellurium-containing compound according to a first embodiment is a tellurium-containing compound represented by the following Formula (M1)

(M1)

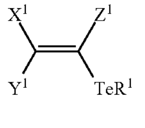

In Formula (M1)

each of $X^1$, $Y^1$, and $Z^1$ independently denotes a hydrogen atom, a fluorine atom, a chlorine atom, a bromine atom, an iodine atom, or an organic group having from 1 to 20 carbon atoms, at least one of $X^1$, $Y^1$, or $Z^1$ denotes a fluorine atom, and $R^1$ denotes an organic group having from 1 to 20 carbon atoms.

Since the tellurium-containing compound according to the first embodiment can introduce, by controlled polymerization, a branched chain into a polymer to be produced, the tellurium-containing compound can be suitably used for producing a polymer having a controlled molecular structure and a branched structure.

In Formula (M1), $R^1$ denotes an organic group having from 1 to 20 carbon atoms, and is preferably a substituted or unsubstituted alkyl group having from 1 to 20 carbon atoms, a substituted or unsubstituted alkoxy group having from 1 to 20 carbon atoms, a substituted or unsubstituted monovalent hydrocarbon group having an oxyalkylene structure and having from 1 to 20 carbon atoms, or a substituted or unsubstituted aryl group having from 3 to 20 carbon atoms. $R^1$ is not linked to any of $X^1$, $Y^1$, and $Z^1$.

The substituted or unsubstituted alkyl group having from 1 to 20 carbon atoms is preferably a substituted or unsubstituted alkyl group having from 1 to 14 carbon atoms and more preferably a substituted or unsubstituted alkyl group having from 1 to 8 carbon atoms.

Examples of the unsubstituted alkyl group having from 1 to 20 carbon atoms include linear, branched, or cyclic alkyl groups such as a methyl group, an ethyl group, an n-propyl group, an isopropyl group, a cyclopropyl group, an n-butyl group, a sec-butyl group, a tert-butyl group, a cyclobutyl group, an n-pentyl group, an n-hexyl group, an n-heptyl group, and an n-octyl group. Among them, a methyl group, an ethyl group, or an n-butyl group is more preferable.

Examples of the substituted alkyl group having from 1 to 20 carbon atoms include alkyl groups in which a hydrogen atom at any position of the above-described unsubstituted alkyl group having from 1 to 20 carbon atoms is substituted with a substituent, such as a fluorine atom, a chlorine atom, an alkoxy group, or a fluoroalkoxy group. Among them, a perfluoroalkyl group is preferable.

Examples of the perfluoroalkyl group include a perfluoromethyl group, a perfluoroethyl group, a perfluoro n-propyl group, a perfluoroisopropyl group, a perfluoro n-butyl group, a perfluoro sec-butyl group, a perfluoro tert-butyl group, a perfluoro n-pentyl group, a perfluoro n-hexyl group, a perfluoro n-heptyl group, and a perfluoro n-octyl group.

The number of carbon atoms of the substituted or unsubstituted monovalent hydrocarbon group having an oxyalkylene structure and having from 1 to 20 carbon atoms is preferably from 1 to 12 and more preferably from 1 to 6.

Examples of the un substituted monovalent hydrocarbon group having an oxyalkylene structure include a hydrocarbon group having an oxyalkylene structure having from 1 to 4 carbon atoms as a constituent unit, and more specific examples thereof include a group represented by $-((CH_2)_m-O)_n-CH_3$. Here, m denotes the number of repetitions of the methylene group, and each independently is preferably an integer from 0 to 4. n denotes the number of repetitions of the $-((CH_2)_m-O)-$ structure, which is 1 or more, and is preferably an integer from 1 to 15.

Examples of the substituted monovalent hydrocarbon group having an oxyalkylene structure include groups in which a hydrogen atom at any position of the oxyalkylene structure in the unsubstituted monovalent hydrocarbon group having an oxyalkylene structure is substituted with a substituent, such as a fluorine atom, a chlorine atom, an alkoxy group, or a fluoroalkoxy group. For example, a monovalent hydrocarbon group having an oxyperfluoroalkylene structure is preferable, and from the viewpoint of ease of synthesis, a monovalent perfluorohydrocarbon group having an oxyperfluoroalkylene structure having from 1 to 4 carbon atoms as a unit is more preferable, and a perfluorohydrocarbon group represented by $-((CF_2)_m-O)_n-CF_3$ is still more preferable. Here, m denotes the number of repetitions of the difluoromethylene group, and each independently is preferably an integer from 0 to 4. n denotes the number of repetitions of the $-((CF_2)_m-O)-$ structure, which is 1 or more, and is preferably an integer from 1 to 15.

In the disclosure, in a case in which the term "monovalent hydrocarbon group having an oxyperfluoroalkylene structure" is used, a hydrogen atom of the hydrocarbon group may be substituted with a fluorine atom or the like.

The substituted or unsubstituted aryl group having from 3 to 20 carbon atoms is preferably a substituted or unsubstituted aryl group having from 3 to 16 carbon atoms and more preferably a substituted or unsubstituted aryl group having from 3 to 12 carbon atoms.

Examples of the unsubstituted aryl group having from 3 to 20 carbon atoms include homoaryl groups, such as a phenyl group and a naphthyl group; and heteroaryl groups, such as a pyridyl group, a pyrrole group, a furyl group, and a thienyl group. Among them, a homoaryl group is preferable, and a phenyl group is more preferable.

Examples of the substituted aryl group having from 3 to 20 carbon atoms include: an aryl group in which any hydrogen atom bonded to an aromatic ring of the above-described unsubstituted aryl group having from 3 to 20 carbon atoms is substituted with a substituent, such as a halogen atom, a hydroxyl group, an alkoxy group, an amino group, a nitro group, a cyano group, a carbonyl-containing group, a sulfonyl group, or a trifluoromethyl group. The number of substituents is not particularly limited, and may be from 1 to 4, from 1 to 3, from 1 to 2, or 1.

In Formula (M1), each of $X^1$, $Y^1$, and $Z^1$ independently denotes a hydrogen atom, a fluorine atom, a chlorine atom, a bromine atom, an iodine atom, or an organic group having from 1 to 20 carbon atoms, and at least one of $X^1$, $Y^1$, or $Z^1$ denotes a fluorine atom. Each of $X^1$, $Y^1$, and $Z^1$ is independently preferably a hydrogen atom, a fluorine atom, a chlorine atom, a substituted or unsubstituted alkyl group having from 1 to 20 carbon atoms, a substituted or unsubstituted monovalent hydrocarbon group having an oxyalkylene structure and having from 1 to 20 carbon atoms, or a substituted or unsubstituted aryl group having from 3 to 20 carbon atoms.

Examples of the substituted or unsubstituted alkyl group having from 1 to 20 carbon atoms, the substituted or unsubstituted monovalent hydrocarbon group having an oxyalkylene structure and having from 1 to 20 carbon atoms, and the substituted or unsubstituted aryl group having from 3 to 20 carbon atoms include the examples described above as the substituted or unsubstituted alkyl group having from 1 to 20 carbon atoms, the substituted or unsubstituted monovalent hydrocarbon group having an oxyalkylene structure and having from 1 to 20 carbon atoms, and the substituted or unsubstituted aryl group having from 3 to 20 carbon atoms, in relation to $R^1$.

Examples of the compound represented by Formula (M1) include phenyl trifluorovinyl telluride, 2,2-difluorovinyl phenyl telluride, 1-chlorodifluorovinyl phenyl telluride, butyl trifluorovinyl telluride, and methyl trifluorovinyl telluride.

[Method for Producing Tellurium-Containing Compound Represented by Formula (M1)]

The method for producing a tellurium-containing compound represented by Formula (M1) is not particularly limited. For example, the tellurium-containing compound represented by Formula (M1) can be obtained by preparing $R^1TeBr$ and a vinyllithium represented by $CX^1Y^1{=}CZ^1Li$, and reacting both of them. Here, $X^1$, $Y^1$, $Z^1$, and $R^1$ are the same as $X^1$, $Y^1$, $Z^1$, and $R^1$ in Formula (M1), respectively.

A specific example of the synthesis scheme is shown below.

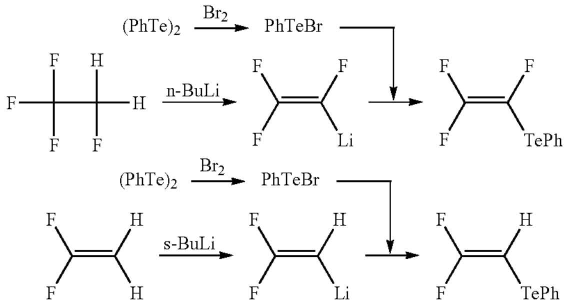

<Polymer>

A polymer according to the first embodiment is obtained by polymerizing at least the above-described tellurium-containing compound according to the first embodiment. The polymer may be a homopolymer or copolymer of the tellurium-containing compound according to the first embodiment. The copolymer may be a block copolymer, a random copolymer, or an alternating copolymer.

In an embodiment, the polymer may be a copolymer obtained by polymerizing the tellurium-containing compound represented by Formula (M1) and a polymerizable compound (hereinafter, also referred to as "first copolymerization monomer") having a carbon-carbon double bond in a molecule and being different from the tellurium-containing compound represented by Formula (M1). One kind of the first copolymerization monomer may be used singly, or two or more kinds thereof may be used in combination.

The first copolymerization monomer is not particularly limited. In an embodiment, the first copolymerization monomer may be a compound represented by the following Formula (M12).

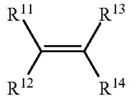

(M12)

In Formula (M12), each of $R^{11}$ to $R^{14}$ independently denotes a hydrogen atom, a fluorine atom, a chlorine atom, a bromine atom, an iodine atom, or a substituted or unsubstituted organic group having from 1 to 40 carbon atoms. $R^1$ and $R^4$ or $R^2$ and $R^3$ may be linked to each other to form a cyclic structure.

The number of carbon atoms of the substituted or unsubstituted organic group having from 1 to 40 carbon atoms for $R^{11}$ to $R^{14}$ is preferably from 1 to 30, more preferably from 1 to 20, and still more preferably from 1 to 12.

Examples of the substituted or unsubstituted organic group having from 1 to 40 carbon atoms include an alkyl group, an aryl group, a heteroaryl group, an aryloxy group, a heteroaryloxy group, an alkoxy group, an arylalkyl group, a heteroarylalkyl group, an arylalkoxy group, a heteroarylalkoxy group, a carboxy group, an alkoxycarbonyl group, a carbamoyl group, an acylamino group, an acyloxy group, a cyano group, and a monovalent hydrocarbon group having an oxyalkylene structure.

In a case in which the substituted or unsubstituted organic group having from 1 to 40 carbon atoms is a hydrocarbon group optionally having a hetero atom, such as an alkyl group, an aryl group, a heteroaryl group, an aryloxy group, a heteroaryloxy group, an alkoxy group, an arylalkyl group, a heteroarylalkyl group, an arylalkoxy group, a heteroarylalkoxy group, or a monovalent hydrocarbon group having an oxyalkylene structure, the hydrocarbon group may be linear, branched, or cyclic, and may or does not necessarily include an unsaturated bond.

Examples of the acyl group of the acylamino group or the acyloxy group include a group in which a hydroxy group is removed from a carboxylic acid or a sulfonic acid.

Examples of the substituent in the organic group having a substituent and having from 1 to 40 carbon atoms include a fluorine atom, a chlorine atom, a hydroxy group, an alkoxy group, an alkoxyalkyl group, an amino group, a carboxylic acid group, a sulfonic acid group, and a 1,3,5-triazinetrione skeleton.

In Formula (M12), $R^{11}$ and $R^{13}$ or $R^{12}$ and $R^{14}$ may be linked to each other to form a cyclic structure. In other words, the compound represented by Formula (M12) may be a compound having a cyclic structure, such as maleic anhydride or itaconic anhydride.

Examples of the first copolymerization monomer include: (meth)acrylic acid ester monomers, such as methyl (meth) acrylate, ethyl (meth)acrylate, propyl (meth)acrylate, butyl (meth)acrylate, octyl (meth)acrylate, lauryl (meth)acrylate, and hydroxyethyl methacrylate; cycloalkyl group-containing unsaturated monomers, such as cyclohexyl (meth)acrylate, methyl cyclohexyl (meth)acrylate, isobornyl (meth) acrylate, and cyclododecyl (meth)acrylate; carboxyl group-containing unsaturated monomers, such as (meth)acrylic acid, maleic acid, fumaric acid, itaconic acid, citraconic acid, crotonic acid, maleic anhydride, or itaconic anhydride; tertiary amine-containing un saturated monomers, such as N,N-dimethylaminopropyl (meth)acrylamide, N,N-dimethylaminoethyl (meth)acrylamide, 2-(dimethylamino)ethyl (meth)acrylate, and N,N-dimethylaminopropyl (meth)acrylate, quaternary ammonium base-containing unsaturated monomers, such as N-2-hydroxy-3-acryloyloxypropyl-N,N,N-trimethylammonium chloride and N-methacryloylaminoethyl-N,N,N-dimethylbenzylammonium chloride; epoxy group-containing unsaturated monomers, such as glycidyl (meth)acrylate; styrene-based monomers, such as styrene, α-methylstyrene, 4-methylstyrene, 2-methylstyrene, 3-methylstyrene, 4-methoxystyrene, 2-hydroxymethylstyrene, 2-chlorostyrene, 4-chlorostyrene, 2,4-dichlorostyrene, 1-vinylnaphthalene, divinylbenzene, 4-(chloromethyl) styrene, 2-(chloromethyl)styrene, 3-(chloromethyl) styrene, and 4-styrenesulfonic acid or alkali metal salts thereof (such as a sodium salt and a potassium salt); heterocyclic ring-containing unsaturated monomers, such as 2-vinylthiophene and N-methyl-2-vinylpyrrole; vinylamides, such as N-vinylformamide and N-vinylacetamide; α-olefins, such as diallylamine, triallyl isocyanurate, tri(2-methyl-allyl)isocyanurate, ethylene, propylene, 1-butene, isobutene, 1-hexene, 1-octene, 1-decene, vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, or 1,2-dichloro-1,2-difluoroethylene, 1H,1H,2H-perfluoro(n-1-hexene), and 1H,1H,2H-perfluoro(n-1-octene); vinyl ester monomers, such as vinyl acetate; divinylfluoroalkanes, such as 1,4-divinyloctafluorobutane and 1,6-divinyldodecafluorohexane; acrylonitrile; acrylamide monomers such as acrylamide and N,N-dimethylacrylamide; alkyl vinyl ethers, such as methyl vinyl ether, ethyl vinyl ether, butyl vinyl ether, tert-butyl vinyl ether, cyclohexyl vinyl ether, hydroxyethyl vinyl ether, and hydroxybutyl vinyl ether; and perfluoro(alkyl vinyl ether), such as perfluoro (methyl vinyl ether), perfluoro(ethyl vinyl ether), and perfluoro(n-propyl vinyl ether).

In an embodiment, the first copolymerization monomer may be a compound represented by the following Formula (M11).

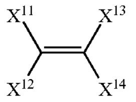

(M11)

In Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

The compound represented by Formula (M1) can introduce a branched chain into a fluorine-containing polymer by copolymerization with a fluorine-containing monomer typified by the compound represented by Formula (M11).

Examples of the organic group having from 1 to 20 carbon atoms denoted by $X^{11}$ to $X^{14}$ in Formula (M11) include a substituted or unsubstituted alkyl group having from 1 to 20 carbon atoms and a substituted or unsubstituted aryl group having from 1 to 20 carbon atoms.

Examples of the substituted or un substituted organic group having from 1 to 20 carbon atoms include an alkyl group, an aryl group, a heteroaryl group, an aryloxy group, a heteroaryloxy group, an alkoxy group, an arylalkyl group, a heteroarylalkyl group, an arylalkoxy group, a heteroarylalkoxy group, a carboxy group, an alkoxycarbonyl group, a carbamoyl group, an acylamino group, an acyloxy group, and a cyano group.

In a case in which the substituted or unsubstituted organic group having from 1 to 20 carbon atoms is a hydrocarbon group optionally having a hetero atom, such as an alkyl group, an aryl group, a heteroaryl group, an aryloxy group, a heteroaryloxy group, an alkoxy group, an arylalkyl group, a heteroarylalkyl group, an arylalkoxy group, or a heteroarylalkoxy group, the hydrocarbon group may be linear, branched, or cyclic, and may or does not necessarily include an unsaturated bond.

Examples of the acyl group of the acylamino group or the acyloxy group include a group in which a hydroxy group is removed from a carboxylic acid or a sulfonic acid.

Examples of the substituent in the organic group having a substituent and having from 1 to 20 carbon atoms include a fluorine atom, a chlorine atom, a hydroxy group, an alkoxy group, an alkoxyalkyl group, an amino group, a carboxylic acid group, and a sulfonic acid group.

Examples of the perfluoroalkyl group include a perfluoromethyl group, a perfluoroethyl group, a perfluoro n-propyl group, a perfluoroisopropyl group, a perfluoro n-butyl group, a perfluoro sec-butyl group, a perfluoro tert-butyl group, a perfluoro n-pentyl group, a perfluoro n-hexyl group, a perfluoro n-heptyl group, and a perfluoro n-octyl group.

The monovalent hydrocarbon group having an oxyperfluoroalkylene structure is more preferably a monovalent perfluorohydrocarbon group having an oxyperfluoroalkylene structure having from 1 to 4 carbon atoms as a unit, and still more preferably a perfluorohydrocarbon group represented by $-((CF_2)_m-O)_n-CF_3$. Here, m denotes the number of repetitions of the difluoromethylene group, and each independently is preferably an integer from 0 to 4. n denotes the number of repetitions of the $-((CF_2)_m-O)-$ structure, and is preferably an integer from 1 to 15.

Examples of the compound represented by Formula (M11) include vinyl fluoride, vinylidene fluoride, trifluoroethylene, chlorotrifluoroethylene, bromotrifluoroethylene, iodotrifluoroethylene, tetrafluoroethylene, hexafluoropropylene, 1,3,3,3-tetrafluoropropylene, 2,3,3,3-tetrafluoropropylene, 1-chloro-1-fluoroethylene, 1-bromo-1-fluoroethylene, 1-iodo-1-fluoroethylene, 1,1-dibromo-2,2-difluoroethylene, 1,1-difluoro-2,2-diiodoethylene, 1,2-dichloro-1,2-difluoroethylene, 1,2-dibromo-1,2-difluoroethylene, and 1,2-difluoro-1,2-diiodoethylene.

The compound represented by Formula (M11) is preferably vinylidene fluoride, trifluoroethylene, chlorotrifluoroethylene, tetrafluoroethylene, hexafluoropropylene, and 2,3,3,3-tetrafluoropropylene, from the viewpoint of polymerization reactivity in obtaining a polymer.

The polymer according to the first embodiment is obtained, for example, by the polymerization method of a polymer according to a fourth embodiment described below.

Second Embodiment

<Polymer>

A polymer according to a second embodiment is obtained by polymerizing at least a tellurium-containing compound represented by the following Formula (M2).

(M2)

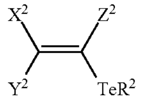

In Formula (M2), each of $X^2$, $Y^2$, and $Z^2$ independently denotes a hydrogen atom, a fluorine atom, a chlorine atom, a bromine atom, an iodine atom, or an organic group having from 1 to 20 carbon atoms, at least one of $X^2$, $Y^2$, or $Z^2$ denotes a chlorine atom, a perfluoroalkyl group, a monovalent hydrocarbon group having an oxyperfluoroalkylene structure, or a phenyl group, and $R^2$ denotes an organic group having from 1 to 20 carbon atoms.

Details of $R^2$ in Formula (M2) are the same as the details of $R^1$ in Formula (M1) described above.

Details of $X^2$, $Y^2$, and $Z^2$ in Formula (M2) are the same as the details of $X^1$, $Y^1$, and $Z^1$ in Formula (M1), except that instead of at least one of $X^1$, $Y^1$, or $Z^1$ in Formula (M1) being a fluorine atom, at least one of $X^2$, $Y^2$, or $Z^2$ in Formula (M2) is a chlorine atom, a perfluoroalkyl group, a monovalent hydrocarbon group having an oxyperfluoroalkylene structure, or a phenyl group.

Examples of the perfluoroalkyl group include a perfluoromethyl group, a perfluoroethyl group, a perfluoro n-propyl group, a perfluoroisopropyl group, a perfluoro n-butyl group, a perfluoro sec-butyl group, a perfluoro tert-butyl group, a perfluoro n-pentyl group, a perfluoro n-hexyl group, a perfluoro n-heptyl group, and a perfluoro n-octyl group.

Examples of the monovalent hydrocarbon group having an oxyperfluoroalkylene structure include a perfluorohydrocarbon group having an oxyperfluoroalkylene structure having from 1 to 4 carbon atoms as a constituent unit.

The phenyl group may or does not necessarily have a substituent, and preferably has no substituent. Examples of the substituent include a substituted or unsubstituted alkyl group, a substituted or unsubstituted monovalent hydrocarbon group having an oxyalkylene structure, a halogen atom, a hydroxyl group, an alkoxy group, an amino group, a nitro group, a cyano group, a carbonyl-containing group, a sulfonyl group, and a trifluoromethyl group, and an unsubstituted alkyl group, a perfluoroalkyl group, an unsubstituted monovalent hydrocarbon group having an oxyalkylene structure, and a monovalent hydrocarbon group having an oxyperfluoroalkylene structure are preferable.

Examples of the compound represented by Formula (M2) include 1-chlorodifluorovinyl phenyl telluride, 2-nonafluorobutylvinyl phenyl telluride, 1-chlorovinyl phenyl telluride, 2-chlorovinyl phenyl telluride, and 1-phenylvinyl phenyl telluride.

The method for producing a tellurium-containing compound represented by Formula (M2) is not particularly limited. For example, the compound represented by Formula (M2) can be obtained by preparing $R^2TeBr$ and a vinyllithium represented by $CX^2Y^2{=}CZ^2Li$, and reacting both of them. Here, $X^2$, $Y^2$, $Z^2$, and $R^2$ are the same as $X^2$, $Y^2$, $Z^2$, and $R^2$ in Formula (M2), respectively. A specific example of the synthesis scheme is in accordance with the example of the method for producing a tellurium-containing compound represented by Formula (M1) in the first embodiment.

The polymer according to the second embodiment may be a homopolymer or copolymer of the tellurium-containing compound represented by Formula (M2). The copolymer may be a block copolymer, a random copolymer, or an alternating copolymer.

In an embodiment, the polymer may be a copolymer obtained by polymerizing the tellurium-containing compound represented by Formula (M2) and a polymerizable compound (hereinafter, also referred to as "second copolymerization monomer") having a carbon-carbon double bond in a molecule and being different from the tellurium-containing compound represented by Formula (M2). One kind of the second copolymerization monomer may be used singly, or two or more kinds thereof may be used in combination.

The second copolymerization monomer is not particularly limited. Details of the second copolymerization monomer are the same as the details of the first copolymerization monomer, except that the copolymerization monomer is a polymerizable compound different from the tellurium-containing compound represented by Formula (M2) instead of the tellurium-containing compound represented by Formula (M1).

In an embodiment, the second copolymerization monomer may be the above-described compound represented by Formula (M11). The compound represented by Formula (M2) can introduce a branched chain into a fluorine-containing polymer by copolymerization with a fluorine-containing monomer typified by the compound represented by Formula (M11).

The polymer according to the second embodiment is obtained, for example, by the method for producing a polymer according to a fifth embodiment described below.

Third Embodiment

<Polymer>

A polymer according to a third embodiment is obtained by polymerizing at least a tellurium-containing compound represented by the following Formula (M3) and a compound represented by the following Formula (M11).

(M3)

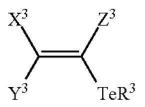

In Formula (M3), each of $X^3$, $Y^3$, and $Z^3$ independently denotes a hydrogen atom, a fluorine atom, a chlorine atom, a bromine atom, an iodine atom, or an organic group having from 1 to 20 carbon atoms, and $R^3$ denotes an organic group having from 1 to 20 carbon atoms.

(M11)

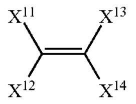

In Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

Details of $R^3$ in Formula (M3) are the same as details of $R^1$ in Formula (M1).

Details of $X^3$, $Y^3$, and $Z^3$ in Formula (M3) are the same as details of $X^1$, $Y^1$, and $Z^1$ in Formula (M1), except that instead of at least one of $X^1$, $Y^1$, or $Z^1$ in Formula (M1) being a fluorine atom, there is no such limitation in Formula (M3).

A method for producing a tellurium-containing compound represented by Formula (M3) is not particularly limited. For example, the compound represented by Formula (M3) is obtained by preparing $R^3TeBr$ and a vinyllithium represented by $CX^3Y^3{=}CZ^3Li$, and reacting both of them. Here, $X^3$, $Y^3$, $Z^3$, and $R^3$ are the same as $X^3$, $Y^3$, $Z^3$, and $R^3$ in Formula (M3), respectively. A specific example of the synthesis scheme is in accordance with the example of the method for producing a tellurium-containing compound represented by Formula (M1) in the first embodiment.

Details of the compound represented by Formula (M11) are as described above.

The polymer according to the third embodiment is obtained, for example, by the method for producing a polymer according to a sixth embodiment described below.

Fourth Embodiment

<Method for Producing Polymer>

A method for producing a polymer according to a fourth embodiment includes polymerizing at least the tellurium-containing compound according to the first embodiment, that is, the tellurium-containing compound represented by Formula (M1), in the presence of at least one compound selected from the group consisting of a compound represented by the following Formula (T1) and a compound represented by the following Formula (T2).

(T1)

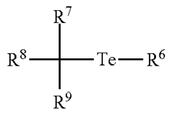

In Formula (T1), $R^6$ denotes a substituted or unsubstituted alkyl group having from 1 to 8 carbon atoms or a substituted or unsubstituted aryl group having from 3 to 16 carbon atoms. each of $R^7$ and $R^8$ independently denotes a hydrogen atom or a substituted or unsubstituted alkyl group having from 1 to 8 carbon atoms. $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group.

$$(R^{10}Te)_2 \quad (T2)$$

In Formula (T2), $R^{10}$ denotes a substituted or unsubstituted alkyl group having from 1 to 8 carbon atoms or a substituted or unsubstituted aryl group having from 3 to 16 carbon atoms.

The method for producing a polymer according to the fourth embodiment is a method for producing a polymer in which at least the tellurium-containing compound according to the first embodiment is polymerized using, as a chain transfer agent, at least one compound selected from the group consisting of the compound represented by Formula (T1) and the compound represented by Formula (T2), on the basis of the TERP method. According to this production method, a polymer having a controlled molecular structure and a branched structure is obtained.

(Compound Represented by Formula (T1))

In Formula (T1), the group denoted by $R^6$ is specifically as follows.

Examples of the unsubstituted alkyl group having from 1 to 8 carbon atoms include linear, branched, or cyclic alkyl groups having from 1 to 8 carbon atoms, such as a methyl group, an ethyl group, an n-propyl group, an isopropyl group, a cyclopropyl group, an n-butyl group, a sec-butyl group, a tert-butyl group, a cyclobutyl group, an n-pentyl group, an n-hexyl group, an n-heptyl group, and an n-octyl group. Among them, a linear or branched alkyl group having from 1 to 4 carbon atoms is preferable, and a methyl group, an ethyl group, or an n-butyl group is more preferable.

Examples of the substituted alkyl group having from 1 to 8 carbon atoms include alkyl groups having a substituent, such as a fluorine atom, a chlorine atom, an alkoxy group, or a fluoroalkoxy group at any position. Among them, an alkyl group having from 2 to 13 fluorine atoms is preferable, and from the viewpoint of suppressing the hydrogen atom abstraction reaction by a radical, a (perfluoroalkyl)ethyl group having from 3 to 8 carbon atoms is more preferable.

Examples of the unsubstituted aryl group having from 3 to 16 carbon atoms include: homoaryl groups, such as a phenyl group and a naphthyl group; and heteroaryl groups, such as a pyridyl group, a pyrrole group, a furyl group, and a thienyl group. Among them, a homoaryl group is preferable, and a phenyl group is more preferable.

Examples of the substituted aryl group having from 3 to 16 carbon atoms include aryl groups having from 1 to 4, preferably from 1 to 3, more preferably one substituent, such as a halogen atom, a hydroxyl group, an alkoxy group, an amino group, a nitro group, a cyano group, a carbonyl-containing group represented by —COR$^a$, a sulfonyl group, or a trifluoromethyl group, at any position, preferably para- or ortho-position. R$^a$ denotes: an alkyl group having from 1 to 8 carbon atoms, preferably a linear or branched alkyl group having from 1 to 4 carbon atoms; an alkoxy group having from 1 to 8 carbon atoms, preferably a linear or branched alkoxy group having from 1 to 4 carbon atoms; an aryl group; or an aryloxy group.

The groups denoted by R$^7$ and R$^8$ are specifically as follows.

Examples of the substituted or unsubstituted alkyl group having from 1 to 8 carbon atoms include the same substituted or unsubstituted alkyl group as the substituted or unsubstituted alkyl group having from 1 to 8 carbon atoms denoted by R$^6$. As R$^7$ and R$^8$, a hydrogen atom or an alkyl group having from 1 to 4 carbon atoms is preferable.

Each group denoted by R$^9$ is specifically as follows.

Examples of the substituted or unsubstituted alkyl group having from 1 to 8 carbon atoms and the substituted or unsubstituted aryl group having from 3 to 16 carbon atoms include the same groups as the group denoted by R$^6$.

Examples of the acyl group having from 2 to 8 carbon atoms include an acetyl group and a benzoyl group.

Examples of the amide group having from 2 to 8 carbon atoms include: carbamoyl group-containing groups, such as a carbamoylmethyl group, a dicarbamoylmethyl group, and a 4-carbamoylphenyl group; thiocarbamoyl group-containing groups, such as a thiocarbamoylmethyl group and a 4-thiocarbamoylphenyl group; and N-substituted carbamoyl group-containing groups, such as a dimethylcarbamoylmethyl group.

Examples of the oxycarbonyl-containing group include a group represented by —COOR$^b$. Here, R$^b$ denotes: a hydrogen atom; an alkyl group having from 1 to 8 carbon atoms, preferably a linear or branched alkyl group having from 1 to 4 carbon atoms; an alkenyl group having from 2 to 8 carbon atoms, preferably a linear or branched alkenyl group having from 2 to 4 carbon atoms; an alkynyl group having from 2 to 8 carbon atoms, preferably a linear or branched alkynyl group having from 2 to 4 carbon atoms; or an aryl group having from 3 to 12 carbon atoms.

The alkyl group having from 1 to 8 carbon atoms, the alkenyl group having from 2 to 8 carbon atoms, the alkynyl group having from 2 to 8 carbon atoms, or the aryl group having from 3 to 12 carbon atoms denoted by R$^b$ may have from 1 to 4, preferably from 1 to 3, more preferably one substituent, such as a halogen atom, a hydroxyl group, an alkoxy group, a trialkylsilyl ether group, a trialkylsilyl group, an amino group, a nitro group, a cyano group, a sulfonyl group, and a trifluoromethyl group, at any position, and does not necessarily have a substituent.

Examples of the oxycarbonyl-containing group include a carboxy group, a methoxycarbonyl group, an ethoxycarbonyl group, a propoxycarbonyl group, an n-butoxycarbonyl group, a sec-butoxycarbonyl group, a tert-butoxycarbonyl group, an n-pentoxycarbonyl group, and a phenoxycarbonyl group. Among them, a methoxycarbonyl group or an ethoxycarbonyl group is preferable.

Among these, R$^9$ is preferably an aryl group having from 5 to 12 carbon atoms, an alkoxycarbonyl group, or a cyano group.

In a preferred embodiment, the compound represented by Formula (T1) may be a compound in which R$^6$ denotes an alkyl group having from 1 to 4 carbon atoms or a phenyl group, each of IC and R$^8$ independently denotes a hydrogen atom or an alkyl group having from 1 to 4 carbon atoms, and R$^9$ denotes an aryl group having from 5 to 12 carbon atoms or an alkoxycarbonyl group.

In a particularly preferred embodiment, the compound represented by Formula (T1) may be a compound in which R$^6$ denotes an alkyl group having from 1 to 4 carbon atoms or a phenyl group, each of R$^7$ and R$^8$ independently denotes a hydrogen atom or an alkyl group having from 1 to 4 carbon atoms, and R$^9$ denotes a phenyl group, a methoxycarbonyl group, or an ethoxycarbonyl group.

Specific examples of the compound represented by Formula (T1) include compounds described in WO 2004/014848 A1 and WO 2004/014962 A1, such as (methyltellanylmethyl)benzene, (methyltellanylmethyl)naphthalene, ethyl-2-methyl-2-methyltellanyl-propionate, ethyl-2-methyl-2-n-butyltellanyl-propionate, (2-trimethylsiloxyethyl)-2-methyl-2-methyltellanyl-propionate, (2-hydroxyethyl)-2-methyl-2-methyltellanyl-propionate, and (3-trimethylsilylpropargyl)-2-methyl-2-methyltellanyl-propionate. Examples thereof further include compounds described in Publication No. 2D03 of Polymer Preprints, Japan Vol. 65, No. 1 (2016), such as ethyl-2-methyl-2-1H,1H,2H,2H-heptadecafluorodecyltellanyl-propionate, methyl-2-methyl-2-1H,1H,2H,2H-heptadecafluorodecyltellanyl-propionate, and N,N-diethyl-2-methyl-2-1H,1H,2H,2H-heptadecafluorodecyltellanyl-propionamide. One kind of the compound represented by Formula (T1) may be used singly, or two or more kinds thereof may be used in combination.

The method for producing the compound represented by Formula (T1) is not particularly limited, and the compound can be produced by known methods described in WO 2004/014848 A1, WO 2004/014962 A1, and WO 2018/164147 A1.

(Compound Represented by Formula (T2))

In Formula (T2), details of R$^{10}$'s are each independently the same as the details of R$^6$ in Formula (T1) above.

In a preferred embodiment, the compound represented by Formula (T2) may be a compound in which each of R$^{10}$'s independently denotes an alkyl group having from 1 to 4 carbon atoms or a phenyl group.

Specific examples of the compound represented by Formula (T2) include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl ditelluride, dicyclobutyl ditelluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, and dipyridyl ditelluride. One kind of the compound represented by Formula (T2) may be used singly, or two or more kinds thereof may be used in combination.

Among them, dimethyl ditelluride, diethyl ditelluride, di-n-propyl ditelluride, di-n-butyl ditelluride, or diphenyl ditelluride is preferable.

(Other Optional Components)

In the method for producing a polymer according to the fourth embodiment, other components, such as a radical initiator, a solvent, an emulsifier, a suspension aid, an acid, and an alkali, may be further used.

—Radical Initiator—

Examples of the radical initiator include an azo-based radical initiator and a peroxide-based radical initiator. One kind of the radical initiator may be used singly, or two or more kinds thereof may be used in combination.

Examples of the azo-based radical initiator include 2,2'-azobis(isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutyramide), 2,2'-azobis(4-methoxy-2,4-dimethylvaleronitrile), 2,2'-azobis(2-methylamidinopropane) dihydrochloride, 2,2'-azobis[2-(2-imidazoline-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

Examples of the peroxide-based radical initiator include diisopropyl peroxydicarbonate, tert-butyl peroxypivalate, and benzoyl peroxide.

—Solvent—

Examples of the solvent include an organic solvent and an aqueous solvent. One kind of the solvent may be used singly, or two or more kinds thereof may be used in combination.

Examples of the organic solvent include benzene, toluene, N,N-dimethylformamide (DMF), dimethyl sulfoxide (DMSO), acetone, 2-butanone (methyl ethyl ketone), dioxane, hexafluoroisopropanol, chloroform, carbon tetrachloride, tetrahydrofuran (THF), ethyl acetate, 1H-perfluorohexane, 1H,1H,1H,2H,2H-perfluorooctane, trifluoromethylbenzene, 1,3-bis(trifluoromethyl)benzene, 1,4-bis(trifluoromethyl)benzene, benzotrifluoride, and chlorobenzene.

Ionic liquids, such as N-methyl-N-methoxymethylpyrrolidinium tetrafluoroborate, N-methyl-N-ethoxymethyltetrafluoroborate, 1-methyl-3-methylimidazolium tetrafluoroborate, 1-methyl-3-methylimidazolium hexafluorophosphate, and 1-methyl-3-methylimidazolium chloride, may also be used.

Examples of the aqueous solvent include water, methanol, ethanol, isopropanol, butanol, ethyl cellosolve, butyl cellosolve, 1-methoxy-2-propanol, and diacetone alcohol.

In an embodiment, the method for producing a polymer according to the fourth embodiment includes polymerizing the tellurium-containing compound according to the first embodiment (that is, the tellurium-containing compound represented by Formula (M1)) and a polymerizable compound (that is, the first copolymerization monomer in the first embodiment) having a carbon-carbon double bond in a molecule and being different from the tellurium-containing compound according to the first embodiment (that is, the tellurium-containing compound represented by Formula (M1)). Details of the first copolymerization monomer are as described above.

[Polymerization Method]

A specific example of the polymerization method in the method for producing a polymer according to the fourth embodiment will be described below.

At least one compound selected from the group consisting of the compound represented by Formula (T1) and the compound represented by Formula (T2) is mixed with the tellurium-containing compound represented by Formula (M1) in a container purged with an inert gas or a vacuum-decompressed container. Examples of the inert gas include nitrogen, argon, and helium. Among these, nitrogen or argon is preferable, and nitrogen is more preferable. A radical initiator, such as an azo-based polymerization initiator, may be used in combination for the purpose of accelerating the polymerization rate.

The amount of the compound represented by Formula (T1) or the compound represented by Formula (T2) (in the case of using the compound represented by Formula (T1) and the compound represented by Formula (T2) in combination, the sum of these) used with respect to 1 mol of the compound having a reactive carbon-carbon double bond (that is, the total of the tellurium-containing compound represented by Formula (M1) and the first copolymerization monomer used as necessary) is preferably 0.001 mol or more, more preferably 0.005 mol or more, and more preferably 0.01 mol or more. The foregoing amount is preferably 1 mol or less, more preferably 0.5 mol or less, and still more preferably 0.1 mol or less.

In the case of using an azo-based polymerization initiator, the amount of the azo-based polymerization initiator used with respect to 1 mol of the compound represented by Formula (T1) or the compound represented by Formula (T2) (in the case of using the compound represented by Formula (T1) and the compound represented by Formula (T2) in combination, the sum of these) is preferably 0.01 mol or more, more preferably 0.05 mol or more, and more preferably 0.1 mol or more. The foregoing amount is preferably 50 mol or less, more preferably 10 mol or less, and still more preferably 5 mol or less.

In the case of using the compound represented by Formula (T1) and the compound represented by Formula (T2) in combination, the amount of the compound represented by Formula (T2) used with respect to 1 mol of the compound represented by Formula (T1) is preferably 0.01 mol or more, more preferably 0.05 mol or more, and still more preferably 0.1 mol or more. The foregoing amount is preferably 100 mol or less, more preferably 10 mol or less, and still more preferably 5 mol or less.

The polymerization reaction can be performed without a solvent, but can also be performed using an organic solvent or an aqueous solvent generally used in radical polymerization.

The amount of the solvent used can be appropriately adjusted. For example, the amount of the solvent with respect to 1000 g of the polymer to be obtained is preferably 0.01 L or more, more preferably 0.05 L or more, and still more preferably 0.1 L or more. The amount of the solvent with respect to 1000 g of the polymer to be obtained is preferably 50 L or less, more preferably 10 L or less, and still more preferably 5 L or less.

Next, the mixture obtained as described above is stirred. The reaction temperature and the reaction time may be appropriately adjusted depending on the molecular weight or molecular weight distribution of the polymer to be obtained, and the mixture may be stirred at from 60° C. to 150° C. for from 5 hours to 100 hours. Alternatively, the mixture may be stirred at from 80° C. to 120° C. for from 10 hours to 30 hours. The reaction may be performed at normal pressure, or pressurization or depressurization may be performed.

After completion of the reaction, the target product is isolated by removing the solvent used, the residual monomer, and the like under reduced pressure by a conventional method to take out the target polymer, or by performing a reprecipitation treatment using a solvent in which the target polymer is insoluble. The reaction treatment can be performed by any treatment method as long as the target product is not hindered.

By such a polymerization method, excellent molecular weight control and molecular weight distribution control can be performed under very mild conditions.

A block copolymer, an alternating copolymer, or a random copolymer may be produced using the tellurium-containing compound represented by Formula (M1) and the first copolymerization monomer.

Examples of reaction schemes of homopolymerization and copolymerization in the fourth embodiment are shown below. In the following figure, In denotes a structure derived from a radical initiator, R denotes $R^1$ or $R^6$, and each of x, y, z, $x_1$, $x_2$, $y_1$, $y_2$, $z_1$, $z_2$, and n independently denotes the number of constituent units. In a case in which there are plural constituent units enclosed by square brackets ([ ]), the arrangement of these constituent units may be random.

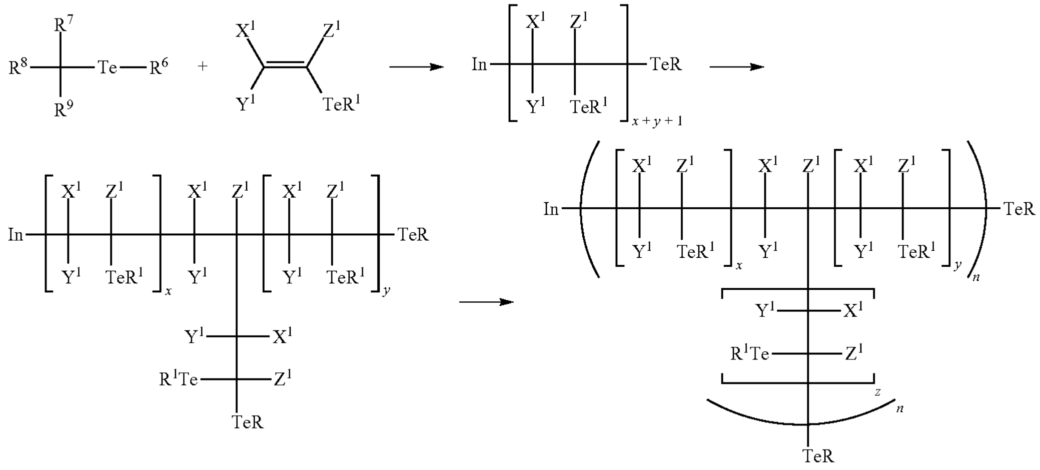

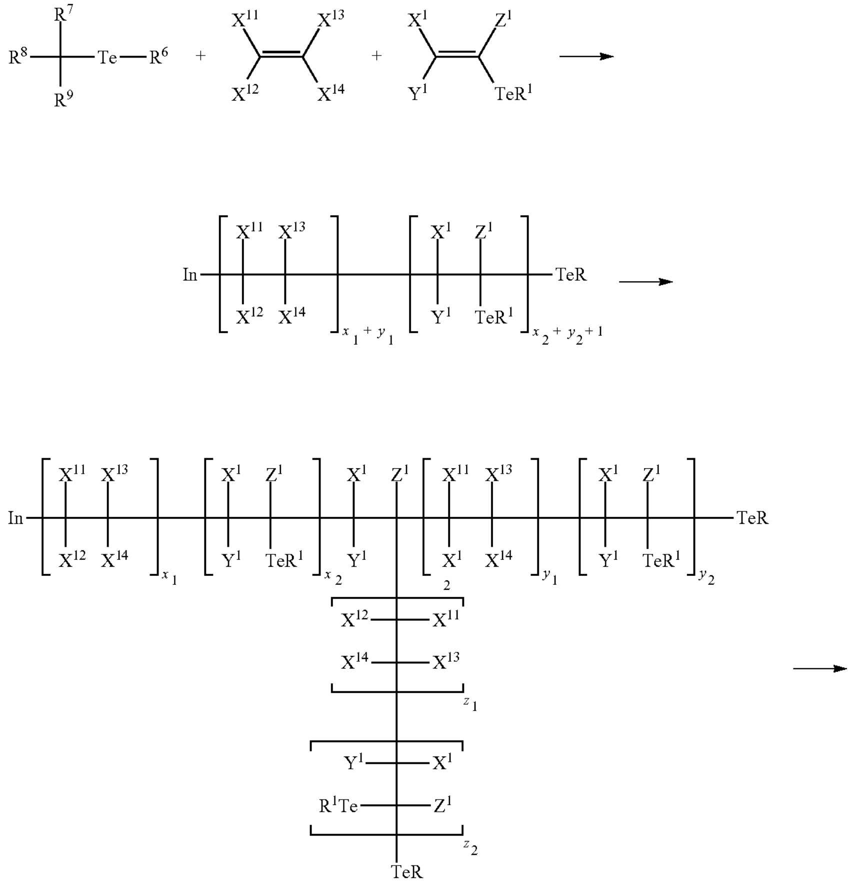

-continued

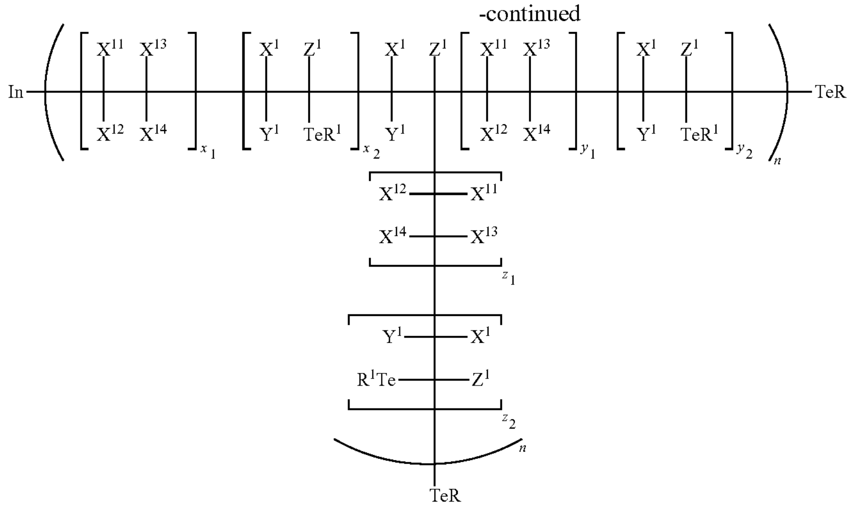

In the case of using the compound represented by (T2) as a chain transfer agent instead of the compound represented by (T1), homopolymerization and copolymerization can also be performed by the reaction scheme according to the foregoing.

Fifth Embodiment

<Method for Producing Polymer>

A method for producing a polymer according to a fifth embodiment includes polymerizing at least a tellurium-containing compound represented by the following Formula (M2) in the presence of at least one compound selected from the group consisting of a compound represented by the following Formula (T1) and a compound represented by the following Formula (T2).

(T1)

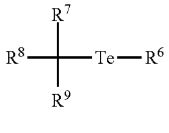

In Formula (T1), $R^6$ denotes a substituted or unsubstituted alkyl group having from 1 to 8 carbon atoms or a substituted or unsubstituted aryl group having from 3 to 16 carbon atoms. Each of $R^7$ and $R^8$ independently denotes a hydrogen atom or a substituted or unsubstituted alkyl group having from 1 to 8 carbon atoms. $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group.

$$(R^{10}Te)_2 \qquad (T2)$$

In Formula (T2), $R^{10}$ denotes a substituted or unsubstituted alkyl group having from 1 to 8 carbon atoms or a substituted or unsubstituted aryl group having from 3 to 16 carbon atoms.

(M2)

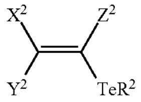

In Formula (M2), each of $X^2$, $Y^2$, and $Z^2$ independently denotes a hydrogen atom, a fluorine atom, a chlorine atom, a bromine atom, an iodine atom, or an organic group having from 1 to 20 carbon atoms, at least one of $X^2$, $Y^2$, or $Z^2$ denotes a chlorine atom, a perfluoroalkyl group, a monovalent hydrocarbon group having an oxyperfluoroalkylene structure, or a phenyl group, and $R^2$ denotes an organic group having from 1 to 20 carbon atoms.

The method for producing a polymer according to the fifth embodiment is a method for producing a polymer in which at least the compound represented by Formula (M2) is polymerized using, as a chain transfer agent, at least one compound selected from the group consisting of the compound represented by Formula (T1) and the compound represented by Formula (T2), on the basis of a TERP method. According to the present production method, a polymer having a controlled molecular structure and a branched structure is obtained. The polymer to be obtained may be the polymer according to the second embodiment.

Details of the compound represented by Formula (T1), the compound represented by Formula (T2), and the compound represented by Formula (M2) are as described above.

In the method for producing a polymer according to the fifth embodiment, other components, such as a radical initiator, a solvent, an emulsifier, a suspension aid, an acid, and an alkali, may be further used. Details of the optional components are as described above.

In an embodiment, the method for producing a polymer according to the fifth embodiment includes polymerizing the tellurium-containing compound represented by Formula (M2) and a polymerizable compound (that is, the second copolymerization monomer) having a carbon-carbon double bond in a molecule and being different from the tellurium-containing compound represented by Formula (M2). Details of the second copolymerization monomer are as described above.

[Polymerization Method]

As a specific example of a polymerization method in the method for producing a polymer according to the fifth embodiment, the same matter as that of the polymerization method described in the fourth embodiment can be applied. However, the "tellurium-containing compound represented by Formula (M1)" is read as the "tellurium-containing compound represented by Formula (M2)", and the "first copolymerization monomer" is read as the "second copolymerization monomer".

Sixth Embodiment

<Method for Producing Polymer>

A method for producing a polymer according to a sixth embodiment includes polymerizing at least a tellurium-containing compound represented by the following Formula (M3) and a compound represented by the following Formula (M11) in the presence of at least one compound selected from the group consisting of a compound represented by the following Formula (T1) and a compound represented by the following Formula (T2).

(T1)

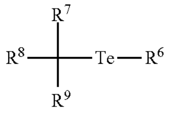

In Formula (T1), $R^6$ denotes a substituted or unsubstituted alkyl group having from 1 to 8 carbon atoms or a substituted or unsubstituted aryl group having from 3 to 16 carbon atoms. Each of $R^7$ and $R^8$ independently denotes a hydrogen atom or a substituted or unsubstituted alkyl group having from 1 to 8 carbon atoms. $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group.

$$(R^{10}Te)_2 \qquad (T2)$$

In Formula (T2), $R^{10}$ denotes a substituted or unsubstituted alkyl group having from 1 to 8 carbon atoms or a substituted or unsubstituted aryl group having from 3 to 16 carbon atoms.

(M3)

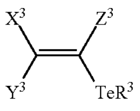

In Formula (M3), each of $X^3$, $Y^3$, and $Z^3$ independently denotes a hydrogen atom, a fluorine atom, a chlorine atom, a bromine atom, an iodine atom, or an organic group having from 1 to 20 carbon atoms, and $R^3$ denotes an organic group having from 1 to 20 carbon atoms.

(M11)

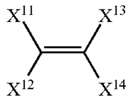

In Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

The method for producing a polymer according to the sixth embodiment is a method for producing a polymer in which at least a tellurium-containing compound represented by Formula (M3) and a compound represented by Formula (M11) are copolymerized using, as a chain transfer agent, at least one compound selected from the group consisting of a compound represented by Formula (T1) and a compound represented by Formula (T2), on the basis of the TERP method. According to this production method, a polymer that has a controlled molecular structure and a branched structure, and that is formed by polymerizing a fluorine-containing monomer, is obtained. The polymer to be obtained may be the polymer according to the third embodiment.

Details of the compound represented by Formula (T1), the compound represented by Formula (T2), the compound represented by Formula (M3), and the compound represented by Formula (M11) are as described above.

In the method for producing a polymer according to the sixth embodiment, other components, such as a radical initiator, a solvent, an emulsifier, a suspension aid, an acid, and an alkali, may be further used. Details of the optional components are as described above.

[Polymerization Method]

As a specific example of the polymerization method in the method for producing a polymer according to the sixth embodiment, the same matter as that of the polymerization method described in the fourth embodiment can be applied. However, the "tellurium-containing compound represented by Formula (M1)" is read as the "tellurium-containing compound represented by Formula (M3)", and the "first copolymerization monomer" is read as the "compound represented by Formula (M11)". At least the tellurium-containing compound represented by Formula (M3) and the compound represented by Formula (M11) are copolymerized.

EXAMPLES

Hereinafter, embodiments of the disclosure will be specifically described with reference to the Examples; however, the embodiments of the disclosure are not limited thereto.

In the following Examples, the nuclear magnetic resonance spectrum (NMR) was measured by Fourier transform NMR. $^1$H-NMR was measured at 300 MHz using tetramethylsilane as a reference with a chemical shift value of 0 ppm. $^{19}$F-NMR was measured at 282 MHz using 1,4-bis(trifluoromethyl)benzene as a reference with a chemical shift value of −63.9 ppm. Abbreviations used in the present text have the following meanings.

s: singlet
d: doublet
t: triplet
m: multiplet

Hz: Hertz
$CDCl_3$: deuterated chloroform
THF-$d_{10}$: $d_{10}$-tetrahydrofuran
$^1$H-NMR: proton nuclear magnetic resonance
$^{19}$F-NMR: fluorine 19 nuclear magnetic resonance In the following Examples, MS (mass spectrum) was measured by GC/MS (gas chromatograph mass spectrometer). As the ionization method, the EI (Electron Ionization) method was used. As the ionization mode, the positive mode (EI+) was used. The data indicates the actual value (found value).

Example 1

Synthesis of Phenyl Trifluorovinyl Telluride ($CF_2$=CFTePh)

A magnetic rotor was added to a glass flask having an internal volume of 300 mL, and the inside was replaced with nitrogen. In a nitrogen atmosphere, 43 g of diethyl ether degassed by freeze-pump-thaw was added, and the internal temperature was cooled to −78° C. with stirring. Under a nitrogen atmosphere, 100 mL (1.6 mol/L, 0.16 mol) of an n-butyllithium/hexane solution was added, and the mixture was stirred for 30 minutes while the internal temperature was maintained at −78° C. This solution is designated as A.

A magnetic rotor and 15 g (36 mmol) of diphenyl ditelluride were added to a glass flask having an internal volume of 100 mL, and the inside was replaced with nitrogen. Under a nitrogen atmosphere, 45 g of tetrahydrofuran degassed by freeze-pump-thaw was added, and the internal temperature was cooled to 0° C. with stirring. Under a nitrogen atmosphere, 5.7 mL (36 mmol) of bromine was added, and the mixture was stirred for 1 hour while the internal temperature was maintained at 0° C. This solution is designated as B.

A magnetic rotor was added to a glass flask having an internal volume of 500 mL, and the inside was replaced with nitrogen. Under a nitrogen atmosphere, 128 g of diethyl ether degassed by freeze-pump-thaw was added, and the internal temperature was cooled to −78° C. with stirring. Under a nitrogen atmosphere, 41 g (400 mmol) of 1,1,1,2-tetrafluoroethane was added, and the mixture was stirred for 10 minutes while the internal temperature was maintained. Under a nitrogen atmosphere, the entire amount of A was added at a constant rate over 30 minutes, and the mixture was stirred for 2 hours while the internal temperature was maintained. Under a nitrogen atmosphere, the entire amount of B was added at a constant rate over 30 minutes, and the mixture was stirred for 30 minutes while the internal temperature was maintained at −78° C. The internal temperature was raised to room temperature over 30 minutes while stirring was continued. The mixture was stirred for 1 hour while the internal temperature was maintained at room temperature.

The reaction vessel was opened in a nitrogen-replaced glovebox, and the reaction mixture was suction-filtered to remove the solid content. The filtrate was washed three times with ion-exchanged water, and the organic phase was collected. The solvent of the organic phase was evaporated under reduced pressure, and the residue was purified by distillation under reduced pressure to obtain the title compound as 5.7 g of an oily material.

$^1$H NMR (300 MHz, $CDCl_3$) δ7.25-7.64 (5H, m)

$^{19}$F NMR (282 MHz, $CDCl_3$) δ−88.3 (1F, dd), δ−105.6 (1F, dd), δ−157.7 (1F, dd)

MS(EI+): [M+] 288.0

Example 2

Synthesis of 2,2-Difluorovinyl Phenyl Telluride ($CF_2$=CHTePh)

A magnetic rotor was added to a glass flask having an internal volume of 100 mL, and the inside was replaced with nitrogen. Under a nitrogen atmosphere, 6.7 g of tetrahydrofuran degassed by freeze-pump-thaw was added, and the internal temperature was cooled to −78° C. with stirring. Under a nitrogen atmosphere, 25 mL (1.3 mol/L, 33 mmol) of a s-butyllithium/hexane/cyclohexane solution was added, and the mixture was stirred for 30 minutes while the internal temperature was maintained at −78° C. This solution is designated as A.

A magnetic rotor and 5.5 g (14 mmol) of diphenyl ditelluride were added to a glass flask having an internal volume of 100 mL, and the inside was replaced with nitrogen. In a nitrogen atmosphere, 45 g of tetrahydrofuran degassed by freeze-pump-thaw was added, and the internal temperature was cooled to 0° C. with stirring. Under a nitrogen atmosphere, 2.2 mL (14 mmol) of bromine was added, and the mixture was stirred for 1 hour while the internal temperature was maintained at 0° C. This solution is designated as B.

A magnetic rotor was added to a glass flask having an internal volume of 300 mL, and the inside was replaced with nitrogen. In a nitrogen atmosphere, 60 g of tetrahydrofuran degassed by freeze-pump-thaw was added, and the internal temperature was cooled to −108° C. with stirring. Under a nitrogen atmosphere, 2.3 g (45 mmol) of vinylidene fluoride was added at a constant rate over 1.5 hours, and the mixture was stirred for 10 minutes while the internal temperature was maintained at −108° C. Under a nitrogen atmosphere, the entire amount of A was added at a constant rate over 30 minutes, and the mixture was stirred for 1 hour while the internal temperature was maintained at −108° C. Under a nitrogen atmosphere, the entire amount of B was added at a constant rate over 30 minutes, and the mixture was stirred for 30 minutes while the internal temperature was maintained at −108° C. The internal temperature was raised to −78° C. while stirring was continued. The mixture was stirred for 30 minutes while the internal temperature was maintained at −78° C. The internal temperature was raised to room temperature over 30 minutes while stirring was continued. The mixture was stirred for 1 hour while the internal temperature was maintained at room temperature.

The reaction vessel was opened in a nitrogen-replaced glovebox, and the reaction mixture was suction-filtered to remove the solid content. The filtrate was washed three times with ion-exchanged water, and the organic phase was collected. The solvent of the organic phase was evaporated under reduced pressure, and the residue was purified by distillation under reduced pressure to obtain the title compound as 1.1 g of an oily material.

$^1$H NMR (300 MHz, $CDCl_3$) δ5.41 (1H, dd), δ7.20-7.32 (4H, m), δ7.68 (2H, dd), $^{19}$F NMR (282 MHz, $CDCl_3$) δ−66.9 (1F, dd), −71.4 (1F, dd)

MS(EI+): [M+] 270.0

Example 3

Preparation of 1-Bromo-1-Chlorodifluoroethylene (Structural Formula: $CF_2$=CClBr)

A magnetic rotor was added to a glass flask having an internal volume of 50 mL, and the inside was replaced with nitrogen. Under a nitrogen atmosphere, 10 g (15 wt %, 39 mmol) of a reduced-pressure degassed aqueous sodium hydroxide solution and 5 g (19 mmol) of 1,2-dibromo-2-chloro-1,1-difluoroethane were added. The mixture was stirred for 30 minutes while the internal temperature was maintained at room temperature. The organic phase was collected and washed three times with ion-exchanged water, and then dried over anhydrous sodium sulfate to obtain the title compound as 2.1 g of a liquid. This compound was used in the next step without further purification.

MS(EI+): [M+] 176.0

Synthesis of 1-Chlorodifluorovinyl Phenyl Telluride ($CF_2$=CClTePh)

A magnetic rotor was added to a glass flask having an internal volume of 300 mL, and the inside was replaced with nitrogen. Under a nitrogen atmosphere, 86 g of diethyl ether degassed by freeze-pump-thaw was added, and the internal temperature was cooled to −78° C. with stirring. Under a nitrogen atmosphere, 8.0 mL (1.6 mol/L, 13 mmol) of an n-butyllithium/hexane solution was added, and the mixture was stirred for 30 minutes while the internal temperature was maintained at −78° C. This solution is designated as A.

A magnetic rotor and 2.0 g (4.8 mmol) of diphenyl ditelluride were added to a glass flask having an internal volume of 50 mL, and the inside was replaced with nitrogen. Under a nitrogen atmosphere, 13 g of tetrahydrofuran degassed by freeze-pump-thaw was added, and the internal temperature was cooled to 0° C. with stirring. Under a nitrogen atmosphere, 0.25 mL (4.8 mmol) of bromine was added, and the mixture was stirred for 1 hour while the internal temperature was maintained at 0° C. This solution is designated as B.

A magnetic rotor was added to a glass flask having an internal volume of 300 mL, and the inside was replaced with nitrogen. Under a nitrogen atmosphere, 86 g of diethyl ether degassed by freeze-pump-thaw was added, and the internal temperature was cooled to −78° C. with stirring. Under a nitrogen atmosphere, 2.0 g (11 mmol) of 1-bromo-1-chlorodifluoroethylene was added, and the mixture was stirred for 10 minutes while the internal temperature was maintained. Under a nitrogen atmosphere, the entire amount of A was added at a constant rate over 30 minutes, and the mixture was stirred for 1 hour while the internal temperature was maintained. Under a nitrogen atmosphere, the entire amount of B was added at a constant rate over 30 minutes, and the mixture was stirred for 1 hour while the internal temperature was maintained. The internal temperature was raised to room temperature over 30 minutes while stirring was continued. The mixture was stirred for 1 hour while the internal temperature was maintained at room temperature.

The reaction vessel was opened in a nitrogen-replaced glovebox, and the reaction mixture was suction-filtered to remove the solid content. The filtrate was washed three times with ion-exchanged water, and the organic phase was collected. The solvent of the organic phase was evaporated under reduced pressure, and the residue was purified by distillation under reduced pressure to obtain the title compound as 0.5 g of an oily material.

$^{1}$H NMR (300 MHz, $CDCl_3$) δ7.19-7.56 (5H, m)

$^{19}$F NMR (282 MHz, $CDCl_3$) δ−83.4 (1F, dd), −84.4 (1F, d)

MS(EI+): [M+] 304.0

Example 4

Synthesis of Butyl Trifluorovinyl Telluride ($CF_2$=CFTeBu)

The title compound was obtained as a liquid in the same manner as in Example 1, except that diphenyl ditelluride in Example 1 was changed to dibutyl ditelluride.

$^{1}$H NMR (300 MHz, $CDCl_3$) δ1.0 (1H, t)

$^{19}$F NMR (282 MHz, $CDCl_3$) δ−86.8 (1F, dd), δ−106.1 (1F, dd), δ−156.6 (1F, dd)

MS(EI+): [M+]268.0

Example 5 below is an example that is expected to be synthesizable on the basis of the findings of the disclosure and known methods.

Example 5

Synthesis of Methyl Trifluorovinyl Telluride ($CF_2$=CFTeMe)

The title compound is obtained as an oily material in the same manner as in Example 1, except that diphenyl ditelluride in Example 1 is changed to dimethyl ditelluride.

Example 6

Copolymerization of Phenyl Trifluorovinyl Telluride and Chlorotrifluoroethylene

In a nitrogen-replaced glovebox, 0.061 g (0.27 mmol) of an azo-based radical initiator "V-601" (FUJIFILM Wako Pure Chemical Corporation), 0.055 g (0.13 mmol) of diphenyl ditelluride, 1.2 g (4.0 mmol) of phenyl trifluorovinyl telluride synthesized in Example 1, and 11 g of benzotrifluoride were charged into a stainless steel autoclave having an internal volume of 30 mL and equipped with a stirrer.

After 3.3 g (28 mmol) of chlorotrifluoroethylene was injected, stirring was started while the internal temperature was raised to 80° C. Stirring was performed at 200 rpm (200 rotations per minute) for 7 hours while the internal temperature was maintained.

After the autoclave was cooled in an ice-water bath, unreacted chlorotrifluoroethylene was purged.

The obtained polymer solution was vacuum-dried to obtain an oily material. This oily material was added into 40 mL of methanol degassed by freeze-pump-thaw in a nitrogen-replaced glovebox and stirred for 5 minutes, and then the oily material and the supernatant were separated using a centrifuge. The obtained oily material was vacuum-dried to obtain 0.2 g of an oily material.

As a result of measurement of $^{19}$F-NMR of the obtained oily material, a peak was observed at δ−177 ppm. Since this was assigned to a fluorine atom bonded to a tertiary carbon atom, it was shown that the polymer had a branched main chain skeleton. Here, the tertiary carbon atom refers to a carbon atom to which three carbon atoms are directly bonded.

Example 7

Copolymerization of Butyl Trifluorovinyl Telluride and Tetrafluoroethylene

In a nitrogen-replaced glovebox, 0.038 g (0.17 mmol) of an azo-based radical initiator "V-601" (FUJIFILM Wako Pure Chemical Corporation), 0.057 g (0.15 mmol) of dibutyl ditelluride, 1.3 g (4.6 mmol) of butyl trifluorovinyl telluride synthesized in Example 4, and 13 g of 1H-perfluorohexane were charged into a stainless steel autoclave having an internal volume of 30 mL and equipped with a stirrer.

After 5.0 g (50 mmol) of tetrafluoroethylene was injected, the reaction was performed by starting stirring while the internal temperature was raised to 72° C. Stirring was performed at 200 rpm for 7 hours while the internal temperature was maintained. After the autoclave was cooled in an ice-water bath, unreacted tetrafluoroethylene was purged.

The obtained polymer solution was vacuum-dried to obtain a solid. This solid was added into 40 mL of methanol degassed by freeze-pump-thaw in a nitrogen-replaced glovebox and stirred for 5 minutes, and then the solid and the supernatant were separated using a centrifuge. The obtained solid was vacuum-dried to obtain 0.5 g of a solid.

Examples 8 to 13 below are examples that are expected to be synthesizable on the basis of the findings of the disclosure and known methods. In any of these examples, since a highly reactive fluorine-containing monomer is used as a copolymerization monomer, it is considered that the copolymers can be suitably synthesized.

Example 8

Copolymerization of 2,2-Difluorovinyl Phenyl Telluride and Chlorotrifluoroethylene In a nitrogen-replaced glovebox, an azo-based radical initiator "V-601" (FUJIFILM Wako Pure Chemical Corporation), diphenyl ditelluride, 2,2-difluorovinyl phenyl telluride synthesized in Example 2, benzotrifluoride, and chlorotrifluoroethylene are charged into a stainless steel autoclave having an internal volume of 30 mL and equipped with a stirrer, and then the reaction is performed by starting stirring while raising the internal temperature to 80° C.

Example 9

Copolymerization of 1-Chlorodifluorovinyl Phenyl Telluride and Chlorotrifluoroethylene In a nitrogen-replaced glovebox, an azo-based radical initiator "V-601" (FUJIFILM Wako Pure Chemical Corporation), diphenyl ditelluride, 1-chlorodifluorovinyl phenyl telluride synthesized in Example 3, benzotrifluoride, and chlorotrifluoroethylene are charged into a stainless steel autoclave having an internal volume of 30 mL and equipped with a stirrer, and then the reaction is performed by starting stirring while raising the internal temperature to 80° C.

Example 10

Copolymerization of 2-Nonafluorobutylvinyl Phenyl Telluride and Chlorotrifluoroethylene In a nitrogen-replaced glovebox, an azo-based radical initiator "V-601" (FUJIFILM Wako Pure Chemical Corporation), diphenyl ditelluride, 2-nonafluorobutylvinyl phenyl telluride synthesized according to a known literature, benzotrifluoride, and chlorotrifluoroethylene are charged into a stainless steel autoclave having an internal volume of 30 mL and equipped with a stirrer, and then the reaction is performed by starting stirring while raising the internal temperature to 80° C.

Example 11

Copolymerization of 1-Chlorovinyl Phenyl Telluride and Chlorotrifluoroethylene In a nitrogen-replaced glovebox, an azo-based radical initiator "V-601" (FUJIFILM Wako Pure Chemical Corporation), diphenyl ditelluride, 1-chlorovinyl phenyl telluride synthesized according to a known literature, benzotrifluoride, and chlorotrifluoroethylene are charged into a stainless steel autoclave having an internal volume of 30 mL and equipped with a stirrer, and then the reaction is performed by starting stirring while raising the internal temperature to 80° C.

Example 12

Copolymerization of 2-Chlorovinyl Phenyl Telluride and Chlorotrifluoroethylene In a nitrogen-replaced glovebox, an azo-based radical initiator "V-601" (FUJIFILM Wako Pure Chemical Corporation), diphenyl ditelluride, 2-chlorovinyl phenyl telluride synthesized according to a known literature, benzotrifluoride, and chlorotrifluoroethylene are charged into a stainless steel autoclave having an internal volume of 30 mL and equipped with a stirrer, and then the reaction is performed by starting stirring while raising the internal temperature to 80° C.

Example 13

Copolymerization of 1-Phenylvinyl Phenyl Telluride and Chlorotrifluoroethylene In a nitrogen-replaced glovebox, an azo-based radical initiator "V-601" (FUJIFILM Wako Pure Chemical Corporation), diphenyl ditelluride, 1-phenylvinyl phenyl telluride synthesized according to a known literature, benzotrifluoride, and chlorotrifluoroethylene are charged into a stainless steel autoclave having an internal volume of 30 mL and equipped with a stirrer, and then the reaction is performed by starting stirring while raising the internal temperature to 80° C.

The entire contents of the disclosures by Japanese Patent Application No. 2020-207031 are incorporated herein by reference.

All documents, patent applications, and technical standards described in the present disclosure are herein incorporated by reference to the same extent as if each individual document, patent application, or technical standard was specifically and individually indicated to be incorporated by reference.

The invention claimed is:

1. A polymer obtained by polymerizing at least a tellurium-containing compound represented by the following Formula (M1):

(M1)

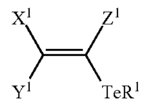

wherein, in Formula (M1):

each of X1, Y1, and Z1 independently denotes a hydrogen atom, a fluorine atom, a chlorine atom, a bromine atom, an iodine atom, or an organic group having from 1 to 20 carbon atoms, and at least one of X1, Y1, or Z1 denotes a fluorine atom, and R1 denotes an organic group having from 1 to 20 carbon atoms.

2. The polymer according to claim 1, wherein the polymer is obtained by polymerizing the tellurium-containing compound and a polymerizable compound having a carbon-carbon double bond in a molecule and being different from the tellurium-containing compound.

3. The polymer according to claim 2, wherein the polymerizable compound is a compound represented by the following Formula (M11):

(M11)

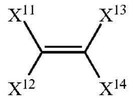

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

4. A method for producing the polymer according to claim 1, the method comprising polymerizing at least the tellurium-containing compound in the presence of at least one compound selected from the group consisting of a compound represented by the following Formula (T1) and a compound represented by the following Formula (T2):

(T1)

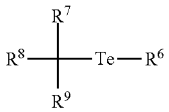

wherein, in Formula (T1), $R^6$ denotes a substituted or unsubstituted alkyl group having from 1 to 8 carbon atoms or a substituted or unsubstituted aryl group having from 3 to 16 carbon atoms, each of $R^7$ and $R^8$ independently denotes a hydrogen atom or a substituted or unsubstituted alkyl group having from 1 to 8 carbon atoms, and $R^9$ denotes a hydrogen atom, a substituted or unsubstituted alkyl group having from 1 to 8 carbon atoms, a substituted or unsubstituted aryl group having from 3 to 16 carbon atoms, an acyl group having from 2 to 8 carbon atoms, an amide group having from 2 to 8 carbon atoms, an oxycarbonyl-containing group, or a cyano group, $$(R^{10}Te)_2 \qquad (T2)$$

wherein, in Formula (T2), $R^{10}$ denotes a substituted or unsubstituted alkyl group having from 1 to 8 carbon atoms or a substituted or unsubstituted aryl group having from 3 to 16 carbon atoms.

5. The method for producing a polymer according to claim 4, the method comprising polymerizing the tellurium-containing compound represented by Formula (M1) and a polymerizable compound having a carbon-carbon double bond in a molecule and being different from the tellurium-containing compound.

6. The method for producing a polymer according to claim 5, wherein the polymerizable compound is a compound represented by the following Formula (M11):

(M11)

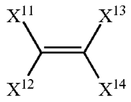

wherein, in Formula (M11), each of $X^{11}$ to $X^{14}$ independently denotes a hydrogen atom, a fluorine atom, a chlorine atom, a bromine atom, an iodine atom, or an organic group having from 1 to 20 carbon atoms, and at least one of $X^{11}$ to $X^{14}$ denotes a fluorine atom, a perfluoroalkyl group, or a monovalent hydrocarbon group having an oxyperfluoroalkylene structure.

7. The polymer according to claim 1, wherein, in Formula (M1), R1 is a substituted or unsubstituted alkyl group having from 1 to 20 carbon atoms, a substituted of unsubstituted alkoxy group having from 1 to 20 carbon atoms, a substituted or unsubstituted monovalent hydrocarbon group having an oxyalkylene structure and having from 1 to 20 carbon atoms, or a substituted or unsubstituted aryl group having from 3 to 20 carbon atoms.

8. The polymer according to claim 1, wherein, in Formula (M1), each of X1, Y1, and Z1 is independently a hydrogen atom, a fluorine atom, a chlorine atom, a substituted or unsubstituted alkyl group having from 1 to 20 carbon atoms, a substituted or unsubstituted monovalent hydrocarbon group having an oxyalkylene structure and having from 1 to 20 carbon atoms, or a substituted or unsubstituted aryl group having from 3 to 20 carbon atoms.

* * * * *